Figure 1:
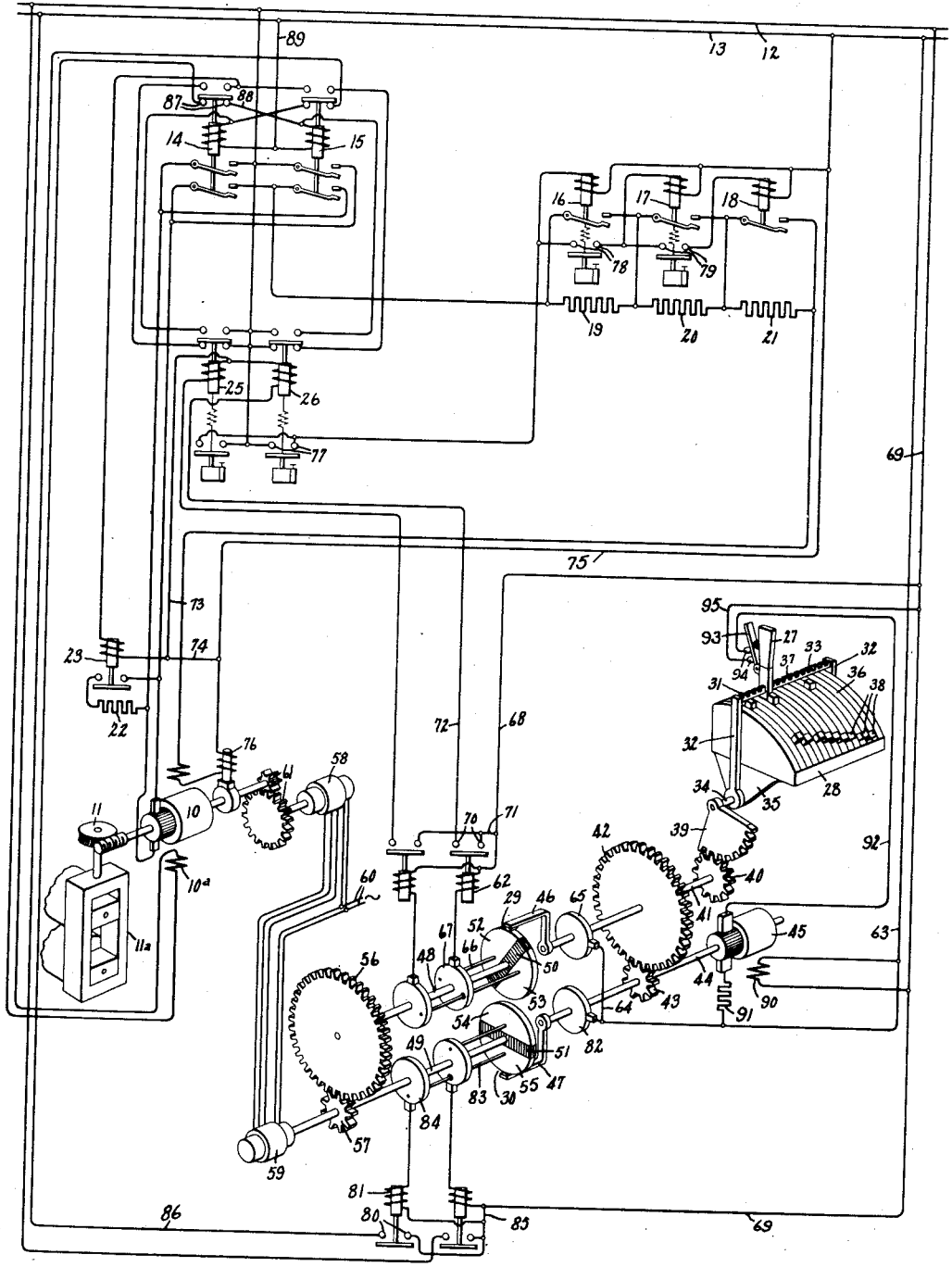

Dec. 10, 1940. L. A. UMANSKY 2,224,619
MOTOR CONTROL SYSTEM
Filed June 17, 1939 2 Sheets-Sheet 1

Inventor:
Leonid A. Umansky,
by Harry E. Dunham
His Attorney.

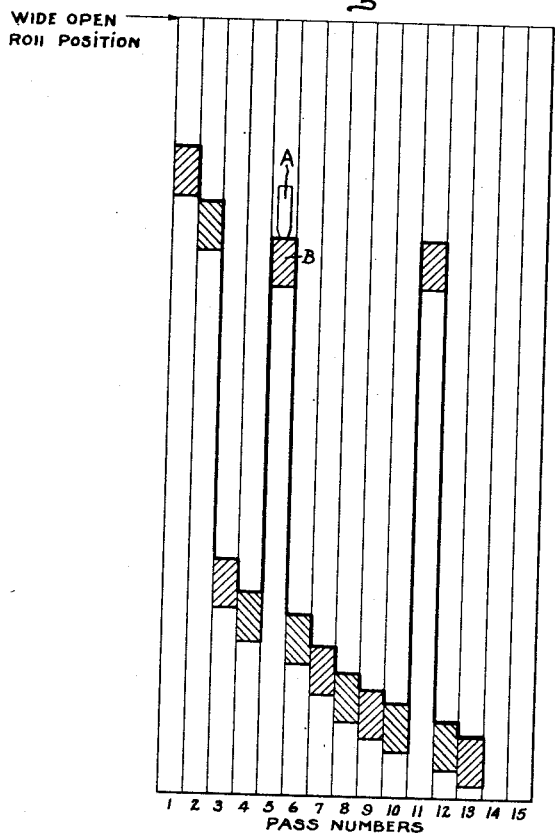
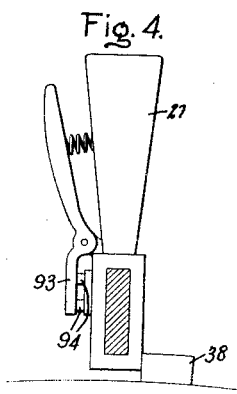

Patented Dec. 10, 1940

2,224,619

UNITED STATES PATENT OFFICE 2,224,619

MOTOR CONTROL SYSTEM

Leonid A. Umansky, Schenectady, N. Y., assignor to General Electric Company, a corporation of New York Application June 17, 1939, Serial No. 279,768

7 Claims. (Cl. 172—239)

My invention relates to a control system for an electric motor arranged to be rotated successively to a plurality of predetermined positions, and has for its object the provision of a simple, accurate and reliable control of the motor.

My invention is particularly useful in connection with rolling mills, wherein a billet or slab of steel is arranged to be repeatedly passed through the mill until the slab or billet has been rolled down to the required size. This has generally been accomplished by running a slab through the mill with the opening between the rollers adjusted so that they will operate to reduce the size of the slab a predetermined amount. It is desirable, therefore, when a large quantity of material is to be rolled in the same way, to provide for automatic adjustment of the rolls for each successive pass.

It is a further object of my invention to provide a master control means for the control system, whereby a program of sequentially controlled operations of the motor is predetermined.

In carrying out my invention in one form thereof, I provide for variable speed control of the screw-down motor, the speed of the motor at a given time being dependent upon the relative position of the roll with respect to a selected roll setting. More specifically, I provide a master control means for adjusting a plurality of positioning means including a coarse control and a vernier control for thé screw-down motor so that the motor may be operated by the coarse control at a high speed to drive the roll to a predetermined distance from a desired setting; the vernier control thereafter functioning to decelerate the motor and to cause the motor to operate at low speed to drive the roll to its predetermined position, thereby insuring great accuracy in the positioning of the roll. In addition, an adjustable program determining means for the sequential operation of the master control element is provided for predetermining the successive control position of the master control element, thereby enabling the predetermination of roll spacing during the successive passes of a complete rolling operation.

For a more complete understanding of my invention reference should be had to the drawings in which Fig. 1 diagrammatically illustrates a control system embodying my invention; Fig. 2 is a schematic view of the cover plate of a master switch showing its stops positioned for a typical program of sequential control; Fig. 3 is a pass schedule diagrammatically illustrating the angular position of a billet during the program of control as determined by the stops shown in Fig. 3; and Fig. 4 is an elevational view of the handle of the master switch positioned against a stop.

Referring to Fig. 1, I have shown my invention in one form as applied to the control of a motor 10 arranged to drive through the gears 11 the lowering and elevating mechanism of one roll of a rolling mill 11a or the like. Preferably, lowering and elevating mechanism is provided at both ends of the roll and is tied to a single motor. In the drawing to conserve space, I have shown only one end of the roll and mechanism. A separately excited field winding 10a provides excitation for the motor, while the armature of the motor 10 is arranged to be selectively energized from direct current supply lines 12 and 13 by means of an up-direction contactor 14 and a down-direction contactor 15. The accelerating contactors 16, 17 and 18 serve to accelerate the motor to its full speed in either direction of rotation. For slow speed operation, in addition to the accelerating resistors 19, 20 and 21, the resistance 22 is arranged to be connected in shunt with the armature of the motor 10 by a contactor 23. A pair of relays 25 and 26 are arranged to selectively control the energization of the direction switches 14 and 15.

To control the operation of the motor 10 for driving the roll 11a up or down to a preselected position, a control system similar to that described in U. S. Patent No. 1,925,881, T. R. Rhea and Wm. B. Snyder, dated September 5, 1933, is used. This system is of the follow-up type in which a predetermined angular movement of the control element, here shown as the master control element or handle 27 of the master switch 28, effects a related operation of the motor 10 to drive the roll 11a to the position selected. During the first portion of the operation of the motor 10 to the preselected position, it is controlled by a coarse control switch 29 and is accelerated to a high speed by the shunting out of the resistances 19, 20 and 21, until the selected position of the roll 11a is approached. Thereafter, a vernier control switch 30 takes over and the motor 10 is decelerated by means of the resistances 19, 20 and 21 and by the connection of the resistance 22 in shunt with the armature circuit. In this manner, and as will be described more fully hereinafter, the roll 11a is brought to the selected position with great accuracy.

The program master switch 28, which will be described hereinafter more fully in connection with program or sequential control of successive roll passes, is equipped with a forked operating lever 31 comprising two radial bars 32 and a connecting cross bar 33, the lower end of the radial bars being secured to a rotatable shaft 34 supported by the brackets 35 so that the forked operating lever 31 straddles the master switch 28. The master control handle 27 is mounted on the cross bar 33 and is angularly movable across the arcuately shaped upper face 36 of the master switch 28 for controlling the position of the upper roll 11a. As will be described, this roll follows the angular movements of the master control handle 27. The master control handle is slidable along the cross bar 33 successively to a number of positions corresponding to the number of passes in a program of operation. Preferably, the notches 37 are provided on the cross bar 33 to aid the operator in positioning the handle for each successive pass. As seen in Figs. 1 and 4, the lower portion of the master control handle 27 abuts on a selected one of the various limiting stops 38 on the upper face 36 of the master switch 28. Each of the stops 38 serves to limit the clockwise rotation of the forked lever 31 and the control handle 27 and thereby predetermine a program of control positions for the master switch 28 easily followed by the operator. Obviously the number of passes required for a complete program of operation will determine the number of stops 38 and corresponding notches 37 needed, and, therefore, I do not wish to be limited to the particular showing in the drawings. Furthermore, as shown in Fig. 1, the upper face 36 of the master switch 28 is an arcuate plate from which the stops 38 project. If desired, the stops 38 may be individually adjustable for setting up a particular program of operation or, preferably, may comprise an integral templet which is replaceable by another templet designed with its stops positioned for a different program. To avoid undue complication, these features have not been indicated in the drawings since they are thought to be obvious to one skilled in the art.

The control motion of the control handle 27 is transmitted to a gear segment 39 secured to the left end of the shaft 34 and to a gear 40 meshed with the gear segment 39. A shaft 41 carries the gear 40 and also a large gear 42 which is meshed with a smaller gear 43 secured on a shaft 44. The gear ratio between the large gear 42 and the small gear 43 may be 10:1 or a similar suitable value. A small D. C. torque motor 45 is also connected to the shaft 44 at its left end and the function of this motor as a biasing element for the control handle 27 will become apparent from the description below.

At the extreme left end of each of the shafts 41 and 44 are provided the contact arms 46 and 47 respectively. The contact arm 46 is in sliding contact with the rotatable coarse control disc 29 mounted on a shaft 48. Likewise, the contact arm 47 rides on the rotatable vernier control disc 30 secured on a shaft 49. The control discs 29 and 30 are substantially identical and comprise the center strips of insulating material 50 and 51, respectively, joining the segments 52 and 53, and 54 and 55, whose function will later become apparent. The contact discs 29 and 30 are connected respectively to the gears 56 and 57 having a gear ratio identical to that of the gears 42 and 43, namely 10:1, or other suitable value. The gear 56 is secured to the shaft 48 and the gear 57 is secured to the shaft 49, the gears being meshed together.

For rotating the shafts 49 and 48 in accordance with the rotation of the screw-down motor 10, a motion transmitting device 58 and a motion receiving device 59 are provided. Electrical motion transmitting devices of the type shown are now being marketed under the trade name "Selsyn" and are described in U. S. Patent No. 1,637,039, E. M. Hewlett, dated July 26, 1927, and in this description will be briefly described by saying that each of these devices is provided with a poly-circuit stator winding with the rotor having a single circuit field winding. The rotor windings are arranged to be energized from a suitable source of alternating current supply as indicated by the supply line 60. Suitable gears 61 connect the screw-down motor 10 to the motion transmitting device 58 which in turn transmits its motion electrically to the motion receiving device 59 in a manner well known to those skilled in the art. The motion receiving device 59 is attached to the left end of the shaft 49 for driving this shaft.

With the above understanding of the elements included in this embodiment of my invention, the operation of the system itself and the manner in which the master control handle 27 accurately controls the operation of the motor 10 will be readily understood from the description which follows:

It will be assumed that the supply lines 12 and 13 are suitably energized and that the master control element or handle 27 has been moved from this starting position at the extreme left of the face plate 36 in a clockwise direction to the predetermined control position determined by the selected one of the stops 38 as indicated in Figs. 1 and 2. Consequently, the contact arm 46 is rotated through a predetermined angle in a counter-clockwise direction from its former position on the insulating strip 50 of the disc 29. This counter-clockwise rotation of the contact arm 46 is transmitted from the handle 27 through the gears 39 and 40 and the shaft 41, and inasmuch as the vernier control contact arm 47 is also geared to the shaft 41 through the gears 42 and 43, the contact arm 47 is rotated in a clockwise direction through an angle, the magnitude of which depends upon the ratio of the gears 42 and 43.

It will be observed that as soon as the contact arm 46 is rotated into engagement with the conducting segment 52, an energizing circuit is completed for a relay 62. This circuit may be traced from the supply line 13 by conductors 63 and 64, the sliding contacts 65, the left end of the shaft 41, the contact arm 46, the segment 52, the conducting bar 66, the sliding contacts 67, operating coil of relay 62, and by conductors 68 and 69 to the other supply line 12. The relay 62 thereupon operates to close its normally open contacts 70, serving to complete an energizing circuit for the relay 26 which in turn will operate the contactor 15 for energizing and operating screw-down motor 10. The circuit for energizing and operating the relay 26 may be traced from the supply line 12 through the conductors 69, 68, and 71 through the contacts 70, the conductor 72, operating coil of the relay 26, conductors 73, 74 and 75 to the other supply line 13. From this point on, reference should be had to U. S. Patent 1,925,881, T. R. Rhea and W. B. Snyder, dated September 5, 1933, wherein the subsequent operation of the relays 15, 16, 17, 18 and 23 for accelerating and decelerating the motor 10 and subsequently applying a brake 76 is clearly described.

Briefly, the relay 26 operates the down-direction relay 15 to its closed position to energize the motor 10. The motor 10 thereupon rotates at low speed in the direction to decrease the opening between the rollers. After a short interval of time, the time interval contacts 77 operated with the relay 26 are closed to energize the first accelerating contactor 16. The accelerating contactor 16 thereupon operates to its closed position to short circuit the first accelerating resistor 19 from the armature circuit of the motor 10. After a short interval of time, the time delay contacts 78, operated with the accelerating contactor 16, are closed to complete an energizing circuit for the second accelerating contactor 17. A short interval of time after the contactor 17 has short circuited the second accelerating resistor 20, the time delay contacts 79, operated with the contactor 17, are closed to complete the energizing circuit for the third accelerating contactor 18. The third accelerating contactor 18 is thereupon operated to short circuit the third accelerating resistor 21 from the armature circuit of the motor 10. The motor now accelerates to its full speed and continues to operate at full speed until the conducting segment 52 has been driven through the gears 61, the motion transmitting and receiving devices 58 and 59, the gears 57 and 56, and the shaft 48 in a counter-clockwise direction through the predetermined angle through which the contact arm 46 was previously moved.

Due to this differential operation, the contact arm 46 will then occupy a position between the conducting segments 52 and 53 on the insulating strip 50. As soon as the insulating strip 50 interrupts the energizing circuit of the relay 62, this relay immediately operates to open its contact 70 to release the relays 26 and 16. The down-direction contactor 15 is not de-energized, however, as a holding circuit is completed for its operating coil by means of the conducting segment 55 of the vernier control member 30. The holding circuit for the down-direction switch 15 is completed through the contacts 80 of a relay 81 which is energized by a circuit which may be traced from the supply line 13, the conductor 63, the sliding contacts 82, the left end of the shaft 44, the contact arm 47, the conducting segment 55, the conducting bar 83, the sliding contacts 84, the holding coil of the relay 81 and by the conductors 85 and 69 to the other supply line 12. The holding circuit for the down-direction switch 15 may be traced from the supply line 12 by the conductor 69 and the conductor 85 through the contacts 80 of the relay 81, a conductor 86, the interlock contacts 87 of the down-direction relay 14, a conductor 88, the operating coil of the relay 15 and by a conductor 89 to the other supply line 13.

It will, therefore, be observed that the opening of the relay 62 serves to transfer the control of the motor 10 from the coarse control disc 29 to the vernier control disc 30.

Continuing with the operation, it will be observed that as the relay 62 and therefore relay 26 is operated to open circuit position, the contactor 23 is operated to its closed position to connect the resistance 22 in shunt with the armature of the motor 10. Inasmuch as the relay 26 in opening its contacts de-energizes the accelerating contactors 16, 17 and 18, it will be seen that the inclusion of the resistances 19, 20 and 21 in series with the armature of the motor 10 and the establishment of the shunt connection through the resistance 22, brakes the motor to a very low speed. The motor 10 continues its low speed operation, however, and drives the roll to the position determined by the setting of the vernier control disc 30. Continued rotation of the motor will ultimately drive the vernier control disc 30 in a clockwise direction to a position where its insulating strip 51 is in register with the contact arm 47. Thereupon, the energizing circuit to the relay 81 is broken, and its contacts 80 open to de-energize the operating coil of the down-direction switch 15, which in turn de-energizes the motor 10. Consequent to the opening of the down-direction switch 15, the motor is de-energized and the brake 73 set to hold the roll of the rolling mill 11a in its predetermined position. The adjustment of the roll for the first pass has now been completed.

From the foregoing description taken in connection with the disclosure of U. S. Patent 1,925,881, it should now be evident that the control system described is inherently of the follow-up type, self-centering and self-correcting. In other words, the roll 11a will always assume a position corresponding to the position of the master control element or handle 27. When handle 27 is rotated clockwise, the roll 11a moves downwardly a proportional distance as described. When the handle 24 is rotated counter-clockwise, the roll 11a moves upwardly, the up-direction switch 14 being controlled through the relay 25 for controlling the motor 10. In this manner, the roll may be said to follow the handle.

In rolling mill operations it is often desired to perform a series of successive operations on a billet in a sequential order which constitutes a given rolling program. To this end, it is desirable to provide means for setting up a predetermined control sequence which may quickly and accurately be followed by the operator. Referring to Fig. 1, as was previously described, the master control handle 27 whose angular movement is followed by the roll 11a is slidable along the cross bar 33 a suitable distance depending upon the number of passes in the rolling program. For purposes of illustration, 15 definite positions or notches 37 are provided on the cross bar 30 so as to definitely locate the handle for any number of passes up to 15. If the maximum number of passes for which the control switch 28 is arranged is 15, then there will be 15 stops 38 properly set on the surface of the cylindrical plate 36. The development of this plate is illustrated in Fig. 3 wherein 13 stops are shown for an illustrative program comprising 13 passes. The master control handle 27, located at any of the 15 notches along the cross bar 30, can be moved clockwise as viewed in Fig. 1 or downwardly as viewed in Fig. 2 only as far as the corresponding stop permits. In Fig. 2 the handle 27 is illustrated by the arrow A and the corresponding stop by the letter B. The greater the roll opening desired for any given pass, the farther away the stop is set from the top or forward edge of the plate corresponding to this pass. In other words, the plate 36 with its stop 38 will serve as a convenient positioning templet which the operator will follow with his master control switch handle 27 whenever the position of the roll 11a is to be changed. For instance, the heavy line in Fig. 2 shows in a reduced scale the "up" and "down" movement of the roll 11a.

An additional provision is made to assist the operator in moving the handle 27 of the master control switch 28 to insure that the latter will always be biased against the proper stop 38. For this purpose, the small D. C. torque motor 45 is continuously connected through the gears 43, 42, 40 and 39 to the forked lever 31 and the handle 27. A field winding 90 for the motor 45 is connected across the supply lines 12 and 13 through the conductors 63 and 69. The armature circuit of the motor 45 traced from the supply line 13 includes the conductor 63, the current limiting resistor 91, the armature of the motor 45, the conductor 92, a hand-operated, spring-biased, bridging contact 93 on the handle 27, the fixed contacts 94 on the handle 27 and extends through a conductor 95 and the conductor 69 to the other supply line 12. As best seen in Fig. 4, when the operator properly grips the handle 27, he will open the bridging contact 93 from the fixed contacts 94 and automatically de-energize the torque motor 45. This removes the normal bias of the motor on the handle 27 and makes it easy to move the handle as desired. However, as soon as the operator releases the handle 27, the torque motor 45 is automatically energized by closure of the contacts 93 and 94, and the handle 27 is again biased against the selected stop B as indicated by the arrow A in Fig. 2 and as shown in Fig. 4. Thus, arranged as shown, the torque motor 45 is equivalent to an electrical "spring return" for the handle 27 which may be made effective or ineffective at the operator's will.

Fig. 2 shows an illustrative program templet cover for rolling a 16½" by 45½" ingot to a 4" x 36" slab in 13 passes. In the starting position the handle 27 will be notched along the bar 33 to the extreme left end of the bar in alignment with the stop for pass 1. Referring to Fig. 2, the handle is moved from the extreme upper position which corresponds to the wide open position of the rolls, downwardly into abutting relation with the first stop for pass 1. This downward movement, or as viewed in Fig. 1, a clockwise movement of the handle 27 is effected by the torque motor 45 upon release of the bridging contact lever 93 which is spring biased to the contact-closed position. Immediately the torque motor 45 is energized and the handle 27 moved against the first stop as illustrated in Fig. 4. The handle 27 is then in its predetermined control position for the first pass, and through the follow-up system previously described, the roll 11a is operated by the motor 10 downwardly to a corresponding position. The first pass of the billet through the rolls may now proceed.

Upon completion of the first pass and while the billet is being manipulated for the second pass, the operator moves the handle 27 to the second of the notches 37. During this adjustment, the torque motor 45 is de-energized at the contacts 93 and 94. Upon release of the handle, the contacts 93 and 94 are re-engaged and the torque motor acts to move and bias the handle 27 against the second of the stops 38. The roll 11a is then positioned accordingly for the second pass.

As illustrated in Fig. 3, the angular position of the billet may be changed from vertical to horizontal for some of the passes comprising the program. Even in this case where considerable change from one roll position to another is required, for instance in pass number 5, the steps in the program are all predetermined by proper positioning of the stops 38 of the cover plate 36 in advance of operation. The operator then may readily follow the proper control settings from pass to pass with great accuracy and ease. Furthermore, by changing adjustable stops or by providing a number of different templet covers for the control switch 28, as many rolling schedules as desired are obtainable.

While I have shown a particular embodiment of my invention, it will be understood, of course, that I do not wish to be limited thereto, since many modifications may be made, and I therefore contemplate by the appended claims to cover any such modifications as fall within the true spirit and scope of my invention.

What I claim as new and desire to secure by Letters Patent of the United States is:

1. The combination in a control system having driving means for moving a member to a plurality of positions between predetermined limits of control means for said driving means including a master control element movable to any one of a plurality of positions, and a limit switch having a normally inactive position and movable from said inactive position to an active position in response to said movement of said control element thereby to effect a related movement of said driving means thereby to correspondingly position said movable member, means actuated by said driving means for restoring said limit switch to said inactive position as said movable member approaches a position of correspondence with said control element, and means for predetermining a program of sequential control positions to which said master control element is movable.

2. The combination in a control system having driving means for moving a member to a plurality of positions between predetermined limits of control means for said driving means including a master control element movable to effect a related movement of said driving means thereby to correspondingly position said movable member, means for predetermining a program of sequential control positions to which said master control element is movable, and biasing means for normally restraining said master control element in said sequential control positions.

3. The combination in a control system having driving means for moving a member to a plurality of positions between predetermined limits of control means for said driving means including a master control element movable to effect a related movement of said driving means thereby to correspondingly position said movable member, means for predetermining a program of sequential control positions to which said master control element is movable, and means including a motor for moving said master control element toward a predetermined one of said sequential control positions and for biasing said master control element in said predetermined position.

4. The combination in a control system having driving means for moving a member to a plurality of positions between predetermined limits of control means for said driving means including a master control element movable to effect a related movement of said driving means thereby to correspondingly position said movable member, means for predetermining a program of sequential control positions to which said master control element is movable, means including a motor for moving said master control element toward a predetermined one of said sequential control positions and for biasing said master control element in said predetermined position, and switching means for deenergizing said biasing motor to remove its bias from said master control element.

5. The combination in a control system having driving means for moving a driven member to a plurality of positions between predetermined limits of control means for said driving means including a movable master control element, means including a plurality of stops against which said master control element may be positioned for predetermining a program of sequential control positions to which said master control element is movable, a limit switch having a pair of cooperating contact members having an inactive relative position and an active relative position, means responsive to movement of said control element toward one of said stops for moving said contact members from said inactive relative position to an active position thereby to energize said driving means to drive said driven member to a position of correspondence with said control member and means actuated by said driving means for restoring said limit switch members to said inactive relative position as said driven member approaches said position of correspondence.

6. The combination in a control system having driving means for moving a member to a plurality of positions between predetermined limits of control means for said driving means including a master control element movable to effect a related movement of said driving means thereby to correspondingly position said movable member, means including a plurality of stops against which said master control element may be positioned for predetermining a program of sequential control positions to which said master control element is movable, and means biasing said master control element toward a predetermined one of said stops in each of said control positions.

7. In combination with a material modifying apparatus, a reversible electric motor, means for controlling the energization of said motor for forward and reverse operations, positioning means having a movable control element movable to predetermine the direction and extent of operation of said motor to a plurality of positions, means for predetermining a plurality of positions to which said control element is movable including a stop for each of said positions, and means for biasing said control element against said stops.

LEONID A. UMANSKY.